United States Patent
Song et al.

(10) Patent No.: US 9,435,927 B2
(45) Date of Patent: Sep. 6, 2016

(54) GUIDE PLATE AND BACKLIGHT ASSEMBLY INCLUDING THE SAME

(71) Applicant: Samsung Display Co., Ltd., Yongin, Gyeonggi-Do (KR)

(72) Inventors: Min Young Song, Asan-si (KR); Dong Yeon Kang, Seoul (KR); Rae Young Kim, Hwaseong-si (KR); Joo Young Kim, Suwon-si (KR); Hyoung Joo Kim, Anyang-si (KR); Sung Kyu Shim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/187,078

(22) Filed: Feb. 21, 2014

(65) Prior Publication Data

US 2015/0098249 A1 Apr. 9, 2015

(30) Foreign Application Priority Data

Oct. 8, 2013 (KR) .................... 10-2013-0119711

(51) Int. Cl.
F21V 7/04 (2006.01)
F21V 8/00 (2006.01)

(52) U.S. Cl.
CPC ............ *G02B 6/002* (2013.01); *G02B 6/0028* (2013.01); *G02B 6/0031* (2013.01); *G02B 6/0073* (2013.01)

(58) Field of Classification Search
CPC .. G02B 6/002; G02B 6/0073; G02B 6/0028; G02B 6/0031
USPC ........ 362/616, 97.1, 97.2, 97.3, 610; 349/65
See application file for complete search history.

(56) References Cited

U.S. PATENT DOCUMENTS

| | | | |
|---|---|---|---|
| 7,102,705 B2 * | 9/2006 | Kim et al. | 349/65 |
| 2006/0269189 A1 | 11/2006 | Seo | |
| 2008/0259634 A1 | 10/2008 | Mi et al. | |
| 2009/0033832 A1 * | 2/2009 | Pai | G02B 6/0028 349/65 |
| 2010/0048085 A1 * | 2/2010 | Kayanuma et al. | 445/23 |
| 2010/0091254 A1 | 4/2010 | Travis et al. | |
| 2010/0123858 A1 * | 5/2010 | Han et al. | 349/65 |
| 2010/0309410 A1 * | 12/2010 | Yang et al. | 349/64 |
| 2010/0328580 A1 * | 12/2010 | Kim | G02B 6/0073 349/64 |
| 2011/0188263 A1 | 8/2011 | Cho et al. | |
| 2011/0222000 A1 * | 9/2011 | Yabe | G02B 6/0016 349/62 |
| 2011/0249424 A1 * | 10/2011 | Joo et al. | 362/97.1 |
| 2011/0267841 A1 * | 11/2011 | Lee | G02B 6/003 362/613 |
| 2012/0188482 A1 | 7/2012 | Lee et al. | |
| 2013/0063682 A1 | 3/2013 | Chen et al. | |
| 2014/0340933 A1 * | 11/2014 | Lin | G02B 6/0028 362/610 |

FOREIGN PATENT DOCUMENTS

| | | |
|---|---|---|
| KR | 10-2012-0016805 | 2/2012 |
| KR | 10-2012-0017159 | 2/2012 |
| KR | 10-2013-0048351 | 5/2013 |
| KR | 10-2013-0055204 | 5/2013 |

* cited by examiner

*Primary Examiner* — Anh Mai
*Assistant Examiner* — Glenn Zimmerman
(74) *Attorney, Agent, or Firm* — Innovation Counsel LLP

(57) ABSTRACT

Disclosed is a light guide plate including a base sheet and a first light transmissive adhesive layer disposed on a surface of the base sheet. The first light transmissive adhesive layer together with the base sheet define a light entrance portion. The thickness of the first light transmissive adhesive layer becomes gradually smaller from the light entrance portion toward a center portion of the base sheet. A backlight assembly includes the light guide plate.

6 Claims, 7 Drawing Sheets

GUIDE PLATE AND BACKLIGHT ASSEMBLY INCLUDING THE SAME

CROSS-REFERENCE TO RELATED APPLICATION

This application claims priority to and the benefit of Korean Patent Application No. 10-2013-0119711, filed on Oct. 8, 2013, with the Korean Intellectual Property Office, the content of which is incorporated herein in its entirety by reference.

BACKGROUND

1. Field

Embodiments relate to a light guide plate having an adhesive layer and to a backlight assembly including the same.

2. Description of the Related Art

A liquid crystal display (LCD) is a type of flat panel display that displays an image using a liquid crystal. The LCD is thinner and lighter compared to other image display devices and has various advantages, such as low driving voltage and lower power consumption, and thus it has been widely used in various industrial fields. On the other hand, since the LCD using the LCD panel is a non-emissive display, the LCD needs a light source that may provide light to the LCD panel, and a backlight assembly having the same.

A light source primarily used in the backlight assembly includes a cold cathode fluorescent lamp (CCFL), a Flat Fluorescent Lamp (FFL), a light emitting diode (LED), and the like. Among others, the LED is possible to be manufactured in a chip form, and has excellent characteristics about power consumption, color reproducibility, and brightness. For these reasons, the LED has been widely used as a light source of backlight assembly.

According to the current trend of slimness and light weight of the LCD, it is also required for a liquid crystal panel and a backlight assembly, which are applied to the LCD, to meet the demand for slimness and light weight. The backlight assembly includes a light source and a light guide plate, and the light guide plate is relatively easy to be formed to be thin and light. The light guide plate formed of a polymer film is very thin and light, and such a light guide plate is called light guide film in particular.

The LED used as a light source of the backlight assembly has also been attempted to be configured to be small in size. However, the LED includes fundamentally a light-emitting chip and an outer frame surrounding the light-emitting chip, and thus it is limited to make its size small. Therefore, when the light guide plate is formed to be thin, a thickness difference between the LED and the light guide plate may occur. Due to the thickness difference, all light of the LED may not be transmitted to the light guide plate, and thus loss of light may be caused, therefore the brightness of the light guide plate is lowered.

SUMMARY

Aspects of embodiments are directed toward a guide plate having a thin base sheet and a backlight assembly to which a thin light guide plate is applied. Aspects of embodiments are directed toward a backlight assembly that may have high brightness and brightness uniformity although a thin light guide plate is applied to the backlight assembly.

According to an embodiment, a light guide plate includes a base sheet and a first light transmissive adhesive layer disposed on one surface of the base sheet. The first light transmissive adhesive layer together with the base sheet defines a light entrance portion. The thickness of the first light transmissive adhesive layer becomes gradually smaller from the light entrance portion toward a center portion of the base sheet.

A difference in a refractive index between the base sheet and the first light transmissive adhesive layer is less than about 0.05.

The base sheet has a refractive index in a range of about 1.45 to about 1.65, and the first light transmissive adhesive layer has a refractive index in a range of about 1.4 to about 1.65.

The base sheet has a thickness of about 0.2 mm to about 0.5 mm.

The light entrance portion has a thickness of about 0.3 mm to about 0.8 mm.

The base sheet includes at least one of polymethyl methacrylate (PMMA), polycarbonate (PC), polystyrene (PS), and polyethylene terephthalate (PET).

The first light transmissive adhesive layer includes at least one of acrylic adhesive, silicone-based adhesive, and urethane-based adhesive.

The light guide plate further includes a reflective sheet on the first light transmissive adhesive layer.

The light guide plate further includes a second adhesive layer on the reflective sheet.

According to an embodiment, a backlight assembly includes a light guide plate having a light entrance portion, and a light source disposed to face the light entrance portion of the light guide plate and configured to irradiate light to the light entrance portion. The light guide plate includes a base sheet, and a first light transmissive adhesive layer disposed on one surface of the base sheet. The first light transmissive adhesive layer together with the base sheet define the light entrance portion, and the thickness of the first light transmissive adhesive layer becomes gradually smaller from the light entrance portion toward a center portion of the base sheet.

The light source includes a light exit surface facing the light entrance portion of the light guide plate, a thickness of the light entrance portion is greater than a height of the light exit surface, and a thickness of the base sheet is smaller than the height of the light exit surface.

The light source includes a printed circuit board, and a plurality of light emitting diodes electrically connected to the printed circuit board and spaced apart from each other.

The light guide plate further includes a reflective sheet on the first light transmissive adhesive layer.

The light guide plate further includes a second adhesive layer on the reflective sheet.

According to embodiments, the light guide plate is advantageous to slimness because it has a thin base sheet, and a thickness of the light entrance portion may increase because an adhesive layer is disposed on the light entrance portion, thereby reducing loss of light entering the light entrance portion from the light source. Further, since the light guide plate has an adhesive layer, it is easy to attach the light guide plate to a printed circuit board or a reflection sheet (reflector; reflection plate; reflection board).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings, in which.

DETAILED DESCRIPTION

Figure 1:
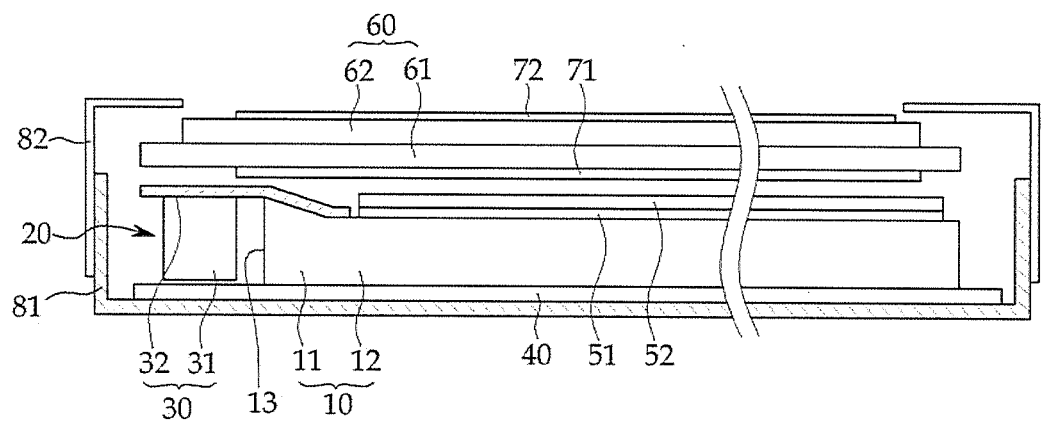
FIG. 1 is a cross-sectional view showing an example of a liquid crystal display.

Advantages and features of the inventive concept and methods for achieving them will be made clear from embodiments described below in detail with reference to the accompanying drawings. Embodiments may, however, be embodied in many different forms and should not be construed as being limited to the embodiments set forth herein. Rather, these embodiments are provided so that this disclosure will be thorough and complete, and will fully convey the scope of the inventive concept to those skilled in the art. The inventive concept is merely defined by the scope of the claims. Therefore, well-known constituent elements, operations and techniques are not described in detail in the embodiments in order to prevent the inventive concept from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not construed as limiting the embodiments. As used herein, the singular forms "a," "an" and "the" are intended to include the plural forms as well, unless the context clearly indicates otherwise. It will be further understood that the terms "comprises" and/or "comprising," when used in this specification, specify the presence of mentioned component, step, operation and/or element, but do not exclude the presence or addition of one or more other components, steps, operations and/or elements.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 shows an example of a liquid crystal display (LCD) which is applied with a backlight assembly according to an embodiment.

The LCD illustrated in FIG. 1 includes a liquid crystal panel 60, a backlight assembly 20, and a bottom cover 81 and a top cover 82 which are to modularize the liquid crystal panel 60 and the backlight assembly 20.

The liquid crystal panel 60 plays a key role in displaying an image, and includes a first substrate 61 and a second substrate 62 that face a liquid crystal layer, which is interposed therebetween, and that are bonded to the liquid crystal layer.

A pixel defined by intersections of a plurality of gate lines and a plurality of data lines is disposed on the first substrate 61 that is generally called a lower substrate or an array substrate, and a thin film transistor is provided at the respective intersections and is connected to a pixel electrode formed at each pixel.

A color filter corresponding to the pixel and a black matrix disposed around the color filter and covering non-display elements such as the gate line, the data line, and the thin film transistor are disposed on the second substrate 62 that is called an upper substrate or a color substrate. Further, a common electrode is formed on the first substrate 61 or the second substrate 62.

Polarizing films 71, 72 are disposed on outer surfaces of the first substrate 61 and the second substrate 62, respectively, in order to selectively transmit specifically polarized light only.

Although not illustrated, a connection member, such as flexible circuit board and tape carrier package, is disposed on at least one edge of the liquid crystal panel 60 so as to connect the liquid crystal panel 60 to a driving circuit.

In the liquid crystal panel 60, when a thin film transistor selected for each gate line is on according to an on or off signal of a gate driver circuit, a signal voltage of a data driver circuit is transferred to a corresponding pixel electrode through a data line. Accordingly, an electric field is generated between the pixel electrode and the common electrode, the electric field changes an arrangement direction of a liquid crystal, thereby making a difference in light transmission, and thus an image is displayed.

On a rear surface of the liquid crystal panel 60, the backlight assembly 20 is disposed to supply light.

The backlight assembly 20 includes a light source 30, a reflective sheet 40, a light guide plate 10 on the reflective sheet 40, and optical sheets 51, 52 on the light guide plate 10.

As the light source 30, a light emitting diode (LED) assembly may be used, and such an LED assembly may have a structure in which a plurality of LEDs 31 are spaced apart from one another at a predetermined distance and are mounted to a printed circuit board 32.

In FIG. 1, each of the LEDs 31 is a type of emitting light to a side, and the printed circuit board 32 may be a flexible printed circuit board (FPCB).

Incident light from the plurality of LEDs 31 repeats total reflection, proceeds inside the light guide plate 10, and evenly spreads over a wide area of the light guide plate 10, thereby providing the liquid crystal panel 60 with a surface light source.

The light guide plate 10 may be divided into a first area 11 having a tapered shape and a second area 12 serving as a planar optical waveguide. In this case, the printed circuit board 32 may extend to cover parts of the first area 11 and the second area 12 of the light guide plate 10.

The first area 11 may have a tapered shape that gradually decreases a thickness from a light entrance portion 13 toward the second area 12. The second area 12 extending from the first area 11 may have a quadrilateral plate shape.

The first area 11 may include the light entrance portion 13 configured to admit light emitted from a light source.

The LED assembly 30, which is a light source, is disposed to face the light entrance portion 13 on a side surface of the first area 11 of the light guide plate 10, and thus light emitted from the LEDs 31 enters the light entrance portion 13 of the first area 11. The first taper-shaped area 11 serves as a guide to allow light emitted by the plurality of LEDs 31 to enter the light guide plate 10 without loss.

A thickness of the light guide plate 10 is not formed in a regular manner because the light guide plate 10 includes the first area 11 and the second area 12, and thus the light guide plate 10 may be manufactured using injection molding employed to form a particular shape. However, in the case where the thickness of the light guide plate 10 becomes small, there is a limit to the injection molding. For example, it is difficult to perform the injection molding where the thickness is less than 0.5 mm. In this case, a film is formed by extrusion, and thereafter a separate member is disposed on a side of the light guide plate of the film, thereby forming a tapered shape.

Further, the light guide plate 10 may include a pattern having a particular shape on its rear surface in order to provide a uniform surface light source. The pattern may be configured in a variety of forms, e.g., oval, polygon, hologram, etc., so as to guide light entering the light guide plate 10.

The reflective sheet 40 is disposed on the rear surface of the light guide plate 10, and the reflective sheet 40 may improve brightness by reflecting light passing through the rear surface of the light guide plate 10 to the liquid crystal panel 60.

The optical sheets 51, 52 on the second area 12 of the light guide plate 10 diffuse or collect light, which is converted into a surface light source by the light guide plate 10, so that a more uniform surface light may enter the liquid crystal panel 60.

For example, the optical sheets 51, 52 may comprise a diffusion sheet 51 configured to diffuse light and a multi-functional sheet 52 configured to diffuse and collect light. The multifunctional sheet 52 comprises at least two optical sheets that are laminated together, and thus a thickness of the whole sheet may be reduced, and further a thickness of the liquid crystal display may be reduced.

The liquid crystal panel 60 and the backlight assembly 20 may be modularized by being mounted on a bottom cover 81 and a top cover 82. Before the liquid crystal panel 60 and the backlight assembly 20 is mounted, where necessary, a separate member (not shown) is used to fix the liquid crystal panel 60 and the backlight assembly 20.

Although not illustrated, a light-shielding member may be disposed between the printed circuit board 32, which is an LED of the backlight assembly 20, and the liquid crystal panel 60 in the modularization process. The light-shielding member is formed to prevent light leakage into an area except for a display area of the liquid crystal panel 60.

Figure 2:
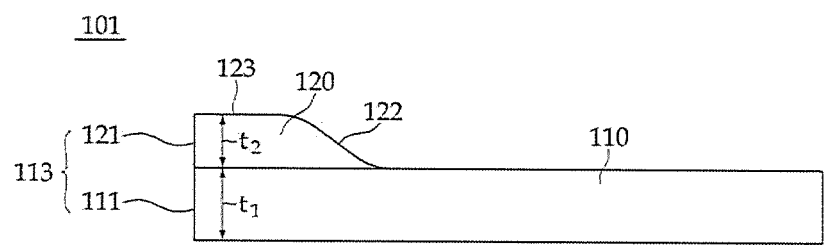
FIG. 2 is a cross-sectional view of a light guide plate according to an embodiment.

FIG. 2 is a cross-sectional view of a light guide plate 101 according to an embodiment.

The light guide plate 101 includes a base sheet 110 and a first adhesive layer 120 on one surface of the base sheet 110, which is configured to constitute a light entrance portion 113 together with the base sheet 110. The first adhesive layer 120 has a thickness that becomes gradually smaller from the light entrance portion 113 toward a center portion of the base sheet 110.

In detail, the base sheet 110 includes a first light entrance surface 111 on one side thereof. The first adhesive layer 120 is disposed on at least one of an upper surface and a lower surface of the base sheet 110, and forms a second light entrance surface 121 extending from the first light entrance surface 111 of the base sheet 110. The first light entrance surface 111 of the base sheet 110 and the second light entrance surface 121 of the first adhesive layer 120 form a continuous surface, and constitute the light entrance portion 113 of the light guide plate 101.

The first adhesive layer 120 has light transmission property and is sometimes called a first light transmissive adhesive layer 120, and an inclined portion of which thickness becomes gradually smaller from the light entrance portion 113 toward the center portion of the base sheet 110.

The base sheet 110 forms an optical waveguide of the light guide plate 101, and the optical waveguide may be manufactured by using a material generally employed in a light guide plate. For example, a polymer may be used for the base sheet 110. The base sheet 110 may include at least one of polymethyl methacrylate (PMMA), polycarbonate (PC), polystyrene (PS), and polyethylene terephthalate (PET), for example.

According to the current trend requiring a slim light guide plate, a very thin polymer film manufactured by an extrusion molding may be used for the base sheet 110. The base sheet 110 may have a thickness of less than 0.5 mm.

Meanwhile, an LED commonly used for a light source of the backlight assembly includes a light-emitting chip and an outer frame, and thus the LED is limited in becoming smaller in size. For this reason, although the polymer film is utilized for the base sheet, in the case where a thickness difference exists between the LED and the base sheet, all light emitted from the LED may not be transferred to the base sheet, thereby causing loss of light. According to an embodiment, the first adhesive layer 120 is disposed on the base sheet 110 so as to extend the light entrance portion compared to other portions of the light guide plate, and thus the light guide plate may reduce loss of light emitted from the light source.

In order to increase a light incidence efficiency, the light guide plate is disposed near a light exit surface of the light source, and for predetermined light incidence, it is necessary to maintain a predetermined distance between the light guide plate and the light source. To this end, the light guide plate is fixed to the printed circuit board provided to the backlight assembly or fixed to different components of other liquid crystal displays.

Further, according to an embodiment, the first adhesive layer 120 plays a role in bonding the light guide plate 101 to other components of the liquid crystal display so as to fix the same.

The second light entrance surface 121 has a height that varies depending on a thickness of the first adhesive layer 120, and a height of the light entrance portion 113 may vary accordingly.

The light entrance portion 113 composed of the first light entrance surface 111 and the second light entrance surface 121 may be larger than the light exit surface of the light source. In consideration of the application of the LED as a light source, the light entrance portion 113 may have a thickness of about 0.3 mm to about 0.8 mm.

Where the polymer film is applied, the first light entrance surface 111 of the base sheet 110 may have a height of about 0.2 mm to about 0.5 mm. Further, when considering a thickness of the base sheet 110 and a size of the light source, the second light entrance surface 121 may have a height of about 0.05 mm to about 0.3 mm.

In order to minimize light loss at an interface between the base sheet 110 and the first adhesive layer 120, a refractive index of the base sheet 110 may be the same as or may be similar to that of the first adhesive layer 120. When the refractive indices of the base sheet 110 and the first adhesive layer 120 are more similar to each other, reflectance may decrease at the interface between the base sheet 110 and the first adhesive layer 120, thereby reducing the light loss.

In detail, a difference in refractive index between the base sheet 110 and the first adhesive layer 120 may be adjusted to be less than 0.05.

In other words, when the refractive index of the base sheet 110 is n1 and the refractive index of the first adhesive layer 120 is n2, respective materials of the base sheet 110 and the first adhesive layer 120 may be selected to satisfy the relation of "0≤n1−n2≤0.05." In the case where the difference in refractive index between the base sheet 110 and the first adhesive layer 120 is 0.05 or less, the light loss at the interface may be slight.

In detail, the refractive index of the base sheet 110 may range from 1.45 to 1.65, and the refractive index of the first adhesive layer 120 may range from 1.4 to 1.65.

A polymer film having a refractive index of about 1.5 may be used for the base sheet 110. For example, the base sheet 110 may be formed of at least one selected from the group consisting of polymethyl methacylate (PMMA) having a refractive index of about 1.49 to about 1.54, polycarbonate (PC) having a refractive index of about 1.54 to about 1.59, and polystyrene (PS) having a refractive index of about 1.49 to about 1.59.

The first adhesive layer 120 may include an adhesive having a refractive index of about 1.5 like the base sheet 110. An optical adhesive generally known as an optically clear adhesive (OCA) may be used for the first adhesive layer 120.

The first adhesive layer 120 may include at least one of acrylic adhesive, silicone adhesive, and urethane adhesive, for example. In detail, the first adhesive layer 120 may be formed of polyurethane acrylate having a refractive index of about 1.43 to about 1.60.

Referring to FIG. 2, a planarization portion 123 is disposed between the second light entrance surface 121 of the first adhesive layer 120 and the inclined portion 122. The planarization portion 123 is a portion where the light guide plate 101 is bonded and fixed to other members. The planarization portion 123 may have a width of about 0.1 mm to about 0.5 mm from a center of the light guide plate 101.

Reflection and refraction of light occur repeatedly in the inclined portion 122 and the planarization portion 123 so that the light may be condensed to the base sheet 110.

In the case where the inclined portion 122 has a steep inclination, effective reflection or total reflection of light does not occur in the inclined portion 122, and thus loss of light may increase. On the other hand, the inclined portion 122 may not elongate without limit for slimness of an element. Therefore, the inclined portion 122 may have an inclination angle of about 15° to about 60° based on a surface of the base sheet 110. The inclined portion 122 may have a width of about 2 mm to about 10 mm from the center of the light guide plate 101.

Figure 3:
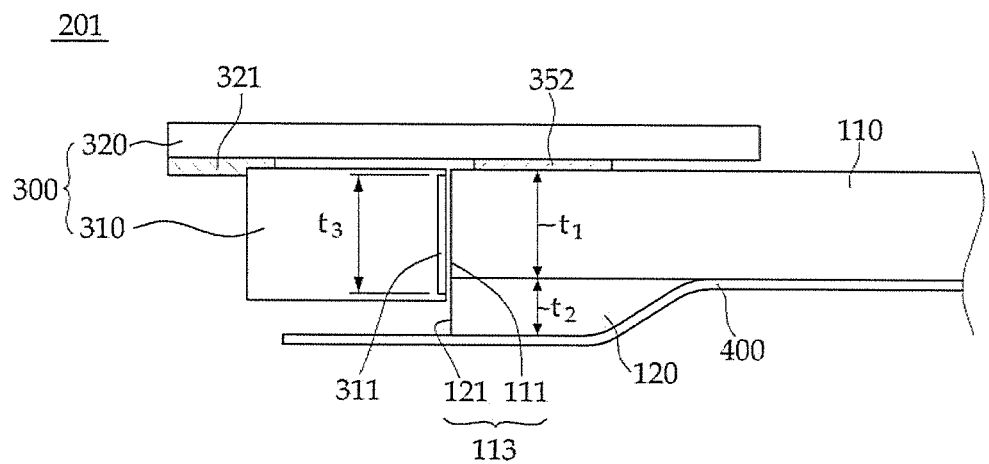
FIG. 3 shows an example of a backlight assembly which is applied with the light guide plate illustrated in FIG. 2.

FIG. 3 shows an example of a backlight assembly 201 which is applied with the light guide plate 101 illustrated in FIG. 2. The backlight assembly 201 includes the light guide plate 101 configured to include the light entrance portion 113, and a light source 300 configured to be disposed to face the light entrance portion 113 of the light guide plate 101 and configured to irradiate light to the light entrance portion 113. The light entrance portion 113 of the light guide plate 101 includes the first light entrance surface 111 of the base sheet 110 and the second light entrance surface 121 of the first adhesive layer 120.

Referring to FIG. 3, a reflection sheet 400 is secured to a bottom surface of the light guide plate 101. The first adhesive layer 120 is disposed under the bottom surface of the light guide plate 101, and plays roles in extending an area of the light entrance portion 113, and also bonding the light guide plate 101 to the reflection sheet 400.

The light source 300 includes a light exiting surface 311 configured to face the light entrance portion 113 of the light guide plate 101, and the light exiting surface 311 has a height that is smaller than a thickness of the light entrance portion 113. However, a thickness of the base sheet 110, namely a height of the first light entrance surface 111, is smaller than the height of the light exiting surface 311.

In detail, when the height of the light exiting surface 311 is t3, the height of the first light entrance surface 111 is t1, and the height of the second light entrance surface 121 of the first adhesive layer is t2, the relation of "t3<t1+t2" is established. Even if the first light entrance surface 111 is lower than the light exiting surface 311 in height, the light entrance portion 113 of the light guide plate 101, which is composed of the first light entrance surface 111 and the second light entrance surface 121, is higher than the light exiting surface 311 of the light source 300. Heights t1, t2, t3 are sometimes called thicknesses t1, t2, t3, respectively.

In other words, "t1<t3<t1+t2" may be satisfied.

An LED assembly may be used as the light source 300. The light source 300 includes a printed circuit board 320, and a plurality of LEDs 310 configured to be electrically connected to the printed circuit board 320 and configured to be spaced apart from one another. The LEDs 310 and the printed circuit board 320 may be electrically connected to each other by a separate connection portion 321.

The base sheet 110 of the light guide plate 101 may be fixed to the printed circuit board 320. In this case, a separate fixing member 352 may be utilized. The fixing member 352 may be an adhesive.

Figure 4:
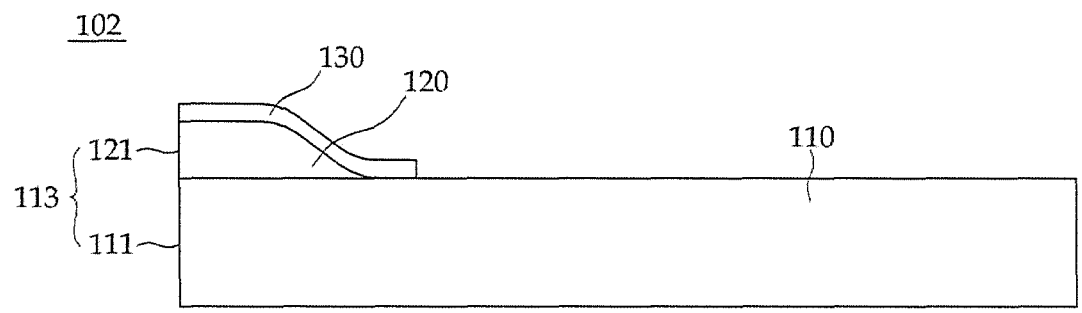
FIG. 4 is a cross-sectional view of a light guide plate according to another embodiment.

FIG. 4 is a cross-sectional view of a light guide plate 102 according to another embodiment.

The light guide plate 102 illustrated in FIG. 4 is configured to further include a reflection sheet 130 on the first adhesive layer 120 of the light guide plate 101 illustrated in FIG. 2.

The reflection sheet 130 allows light, which passes through the first adhesive layer 120 and is directed toward the outside, to be reflected back to the inside of the light guide plate 102, thereby reducing loss of light.

Any one of a number of types of reflection sheets may be used as the reflection sheet 130. For example, a reflection sheet in which a thin film polymer sheet is coated with a metal may be used.

Referring to FIG. 4, the reflection sheet 130 is disposed along the planarization portion and the inclined portion of the first adhesive layer 120.

Figure 5:
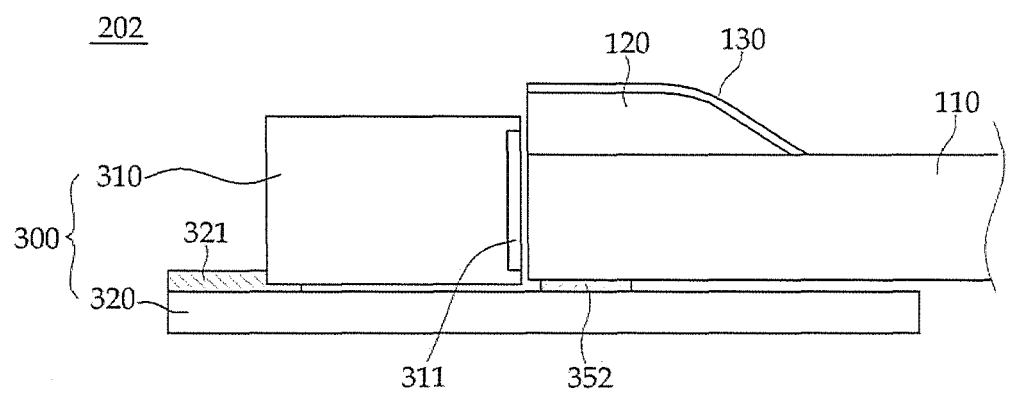
FIG. 5 shows an example of a backlight assembly which is applied with the light guide plate illustrated in FIG. 4.

FIG. 5 shows an example of a backlight assembly 202 which is applied with the light guide plate 102 illustrated in FIG. 4. Herein, the base sheet 110 of the light guide plate 102 is fixed to the printed circuit board 320 of the light source 300 by the fixing member 352. In the case where an upper surface of the reflection sheet 130 is not used for an adhesive portion, an adhesive layer is not necessarily disposed on the reflection sheet 130 separately.

Figure 6:
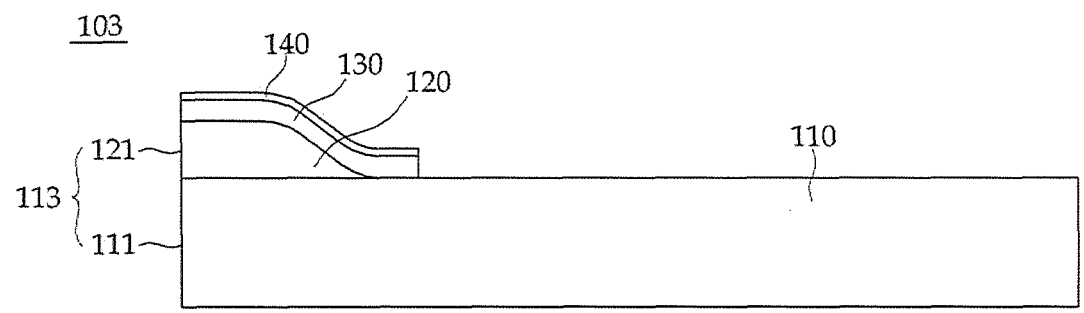
FIG. 6 is a cross-sectional view of a light guide plate according to yet another embodiment.

FIG. 6 is a cross-sectional view of a light guide plate 103 according to yet another embodiment, and the light guide plate 103 further includes a second adhesive layer 140 on the reflection sheet 130.

As illustrated in FIG. 6, since the second adhesive layer 140 is disposed on the reflection sheet 130, the light guide plate 103 may be attached and fixed to other components of the liquid crystal display by means of the second adhesive layer 140.

Figure 7:
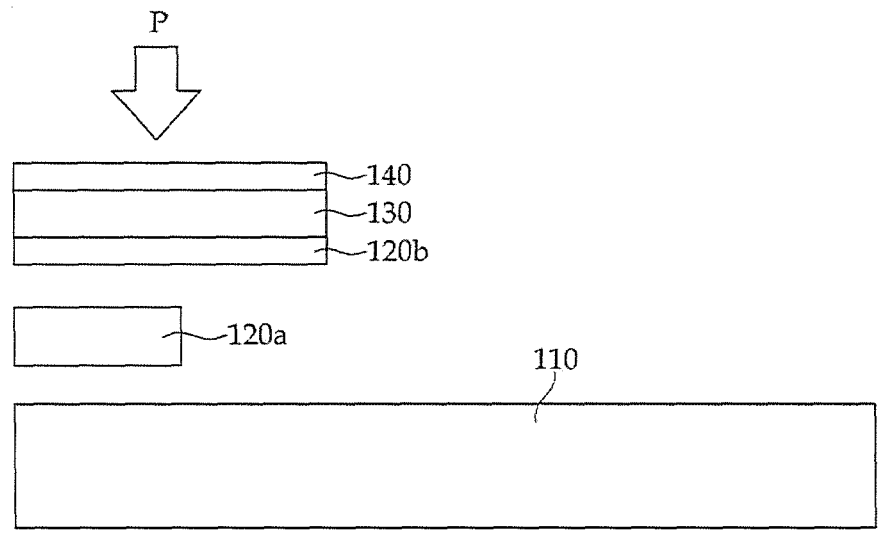
FIG. 7 shows an example of a method for manufacturing the light guide plate illustrated in FIG. 6.

FIG. 7 shows an example of a method for manufacturing the light guide plate 103 illustrated in FIG. 6.

In FIG. 7, a predetermined adhesive pattern 120a is disposed on the base sheet 110, a double-sided tape having the reflection sheet 130 is disposed on the predetermined adhesive pattern 120a, and thereafter pressure is applied thereto, thereby manufacturing the light guide plate 103. Herein, the double-sided tape is configured to have the reflection sheet 130 as a substrate, wherein an adhesive layer is disposed on both sides thereof. The adhesive layer disposed on a top portion of the reflection sheet 130 is the second adhesive layer 140, and the adhesive layer 120b disposed on a bottom portion of the reflection sheet 130 is the first adhesive layer 120 together with the adhesive pattern 120a.

In this case, the adhesive pattern 120a may have a thickness of about 20 µm to about 200 µm, and for example, it may be selected from commercially available OCA products having a thickness of 50 µm. A reflection film having a thickness of about 50 µm to about 100 µm may be used for the reflection sheet 130 of the double-sided tape, and commercially available ESR (Vikuiti™) having a thickness of 65 µm may be used. The adhesive layers 140 and 120b respectively disposed on the top portion and the bottom portion of the reflection sheet 130 may have a thickness of about 10 µm to about 30 µm, and for example, the adhesive layers 140 and 120b may be selected from commercially available OCA products having a thickness of 25 µm.

Figure 8:
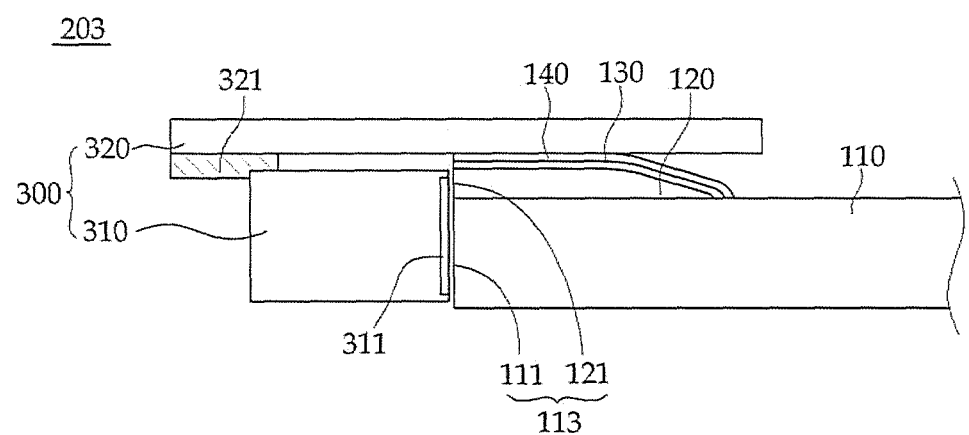
FIG. 8 shows an example of a backlight assembly which is applied with the light guide plate illustrated in FIG. 6.

FIG. 8 shows an example of a backlight assembly 203 which is applied with the light guide plate 103 illustrated in FIG. 6. In detail, the reflection sheet 130 is disposed on the first adhesive layer 120 of the backlight assembly 203, the second adhesive layer 140 is disposed on the reflection sheet 130, and the second adhesive layer 140 is bonded to the printed circuit board 320.

Figure 9A:
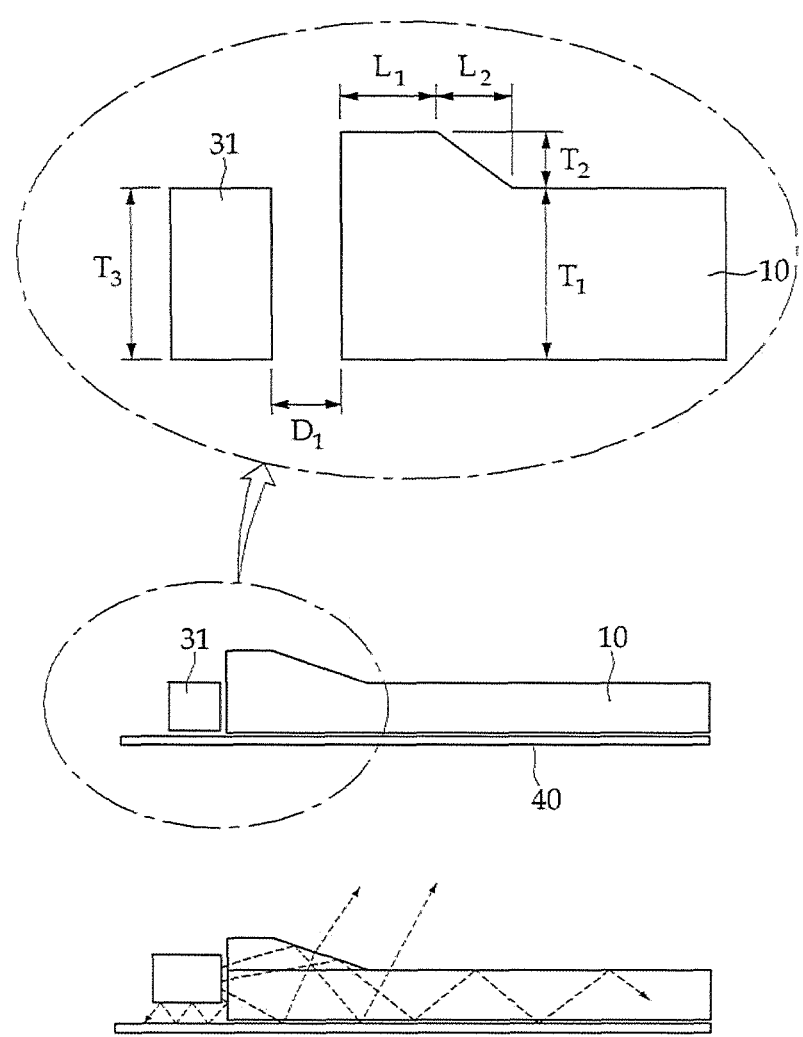
FIGS. 9A, 9B, 9C are schematic diagrams showing light efficiency simulation in light guide plates having different structures.
Figure 9B:
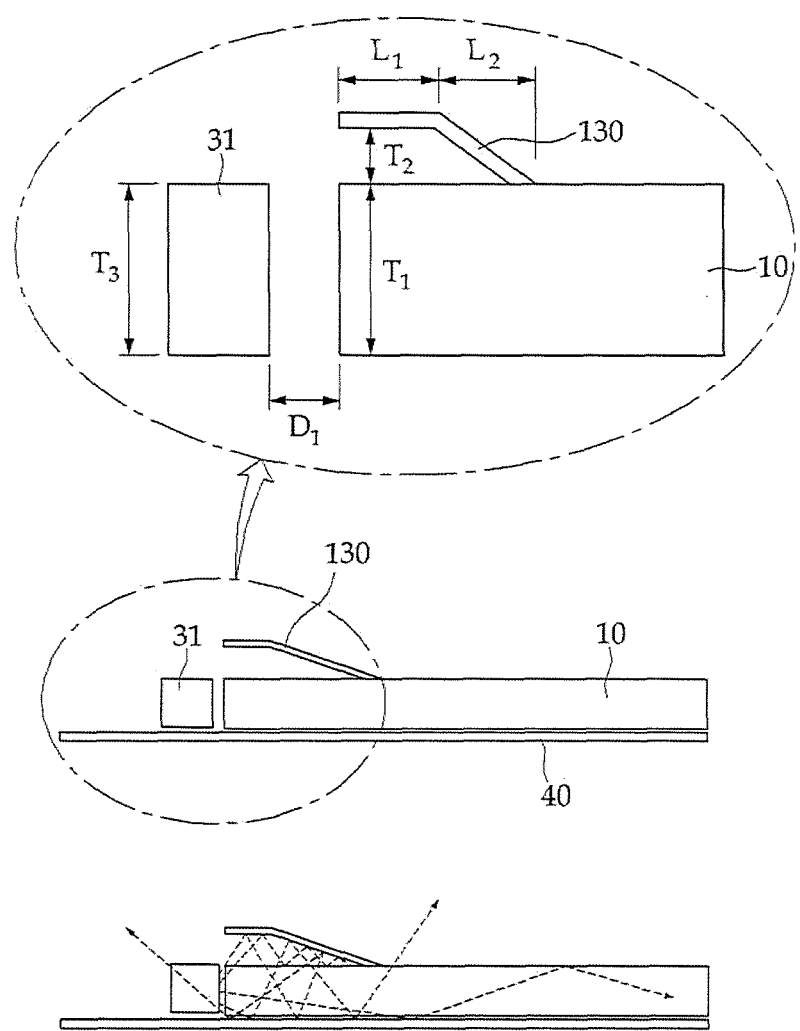
Figure 9C:
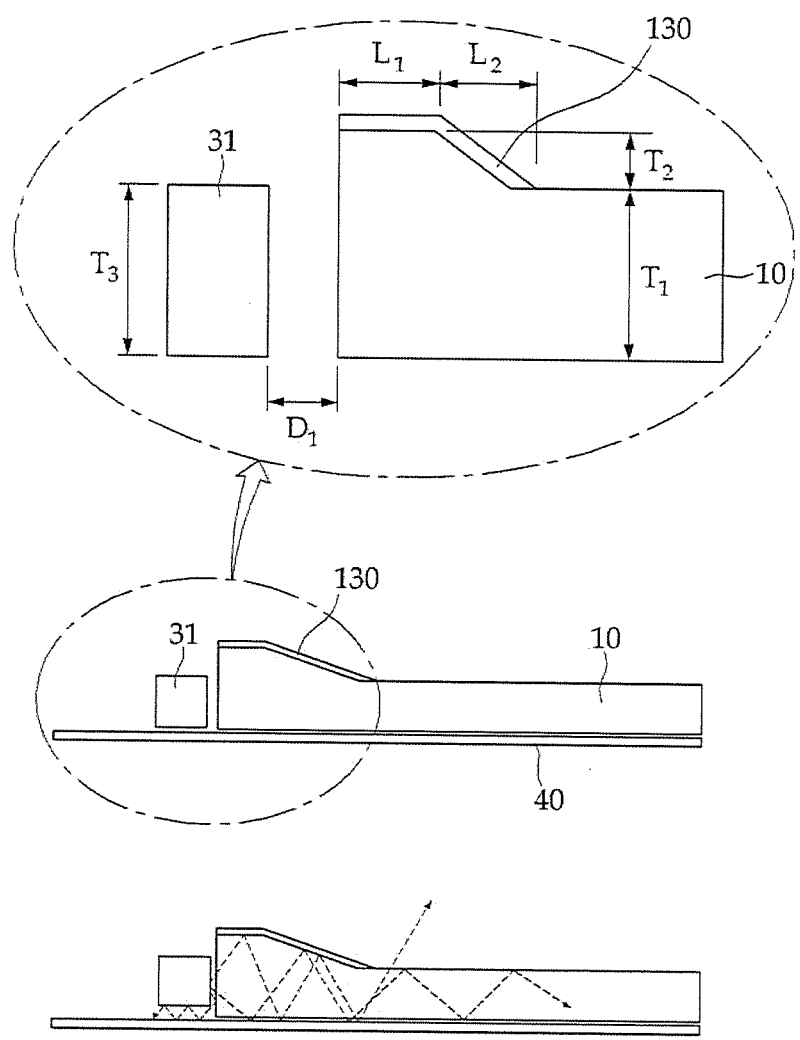

FIGS. 9A to 9C show arrangements of a light source and a light guide plate for light efficiency simulation using light guide plates having different structures.

An example of FIG. 9A uses a light guide plate 10 having a taper part, an example of FIG. 9B uses a light guide plate 10 in which a planar base sheet is provided only with a reflection sheet 130, and an example of FIG. 9C uses a light guide plate 10 in which a taper part is provided with a reflection sheet 130 in order to carry out the light efficiency simulation. In FIGS. 9A to 9C, a reflective sheet 40 is provided under the light guide plate 10. Herein, conditions such as height and distance are all the same, and T1=0.3 mm, T2=0.2 mm, T3=0.3 mm, L1=0.3 mm, L2=0.5 mm, and D1=0.02 mm.

Amounts of light at an end of the taper part or at an end of the reflection sheet are compared to each other after an amount of light falling on a light entrance portion of the light guide plate measures 1 lm. The measured amounts of light are 0.786 lm in the example of FIG. 9A, 0.767 lm in the example of FIG. 9B, and 0.820 lm in the example of FIG. 9C. When the amount of light measured in the example of FIG. 9A is 100%, the amounts of light measured in the examples of FIGS. 9B and 9C are 97.6% and 104%, respectively. As described above, the light efficiency increases in the case where the light guide plate has a light entrance portion including a taper part and also is provided with a reflection sheet.

Figure 10A:
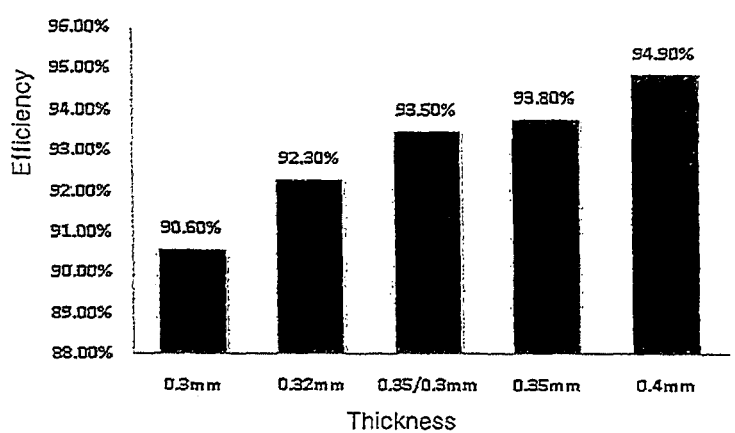
FIG. 10A is a graph comparing light incidence efficiency according to a thickness of a light guide plate.

FIG. 10A is a graph comparing light incidence efficiency according to a thickness of a light guide plate. In detail, when an LED is utilized as a light source, and a light-emitting window of the LED has a height of 0.3 mm, the light incidence efficiency according to a thickness of a light guide plate is compared in the graph. In the graph of FIG. 10A, the horizontal axis indicates a thickness of a light guide plate, and the bar described as 0.35/0.3 mm in the horizontal axis shows that the thickness of the light entrance portion having a taper part is 0.35 mm, and the thickness of a planarization portion thereof is 0.3 mm. The vertical axis of the graph indicates the light incidence efficiency of the light guide plate in comparison with an amount of light exiting from the light source.

Referring to FIG. 10A, as the thickness of the light guide plate becomes larger, the light incidence efficiency is improved. Even though the thickness of the light entrance portion increases only because the light entrance portion includes the taper part, the light incidence efficiency may be improved as much as the case where the thickness of the entire light guide plate increases (compare the value of 0.35/0.3 mm to the value of 0.35 mm).

Figure 10B:
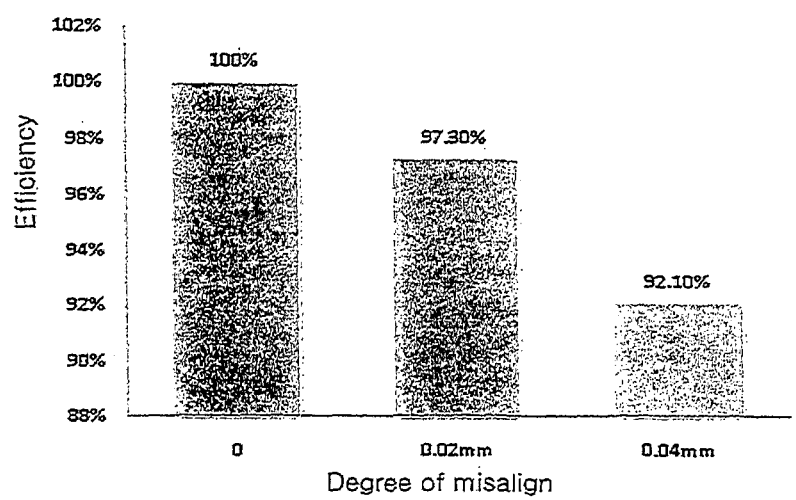
FIG. 10B is a graph showing a degree of brightness reduction according to a degree of misalignment between a light source and a light guide plate.

FIG. 10B is a graph showing a degree of brightness reduction according to a degree of misalignment between a light source and a light guide plate. FIG. 10B shows a result of simulation of the case where the light-emitting window of the LED has a height of 0.3 mm, and the thickness of the light guide plate is 0.3 mm. In FIG. 10B, the horizontal axis of the graph indicates a degree of misalignment, and the vertical axis thereof indicates a relative light incidence efficiency when an alignment is correct, and in other words, the value of the horizontal axis is 0 mm and the light incidence efficiency is 100%. Referring to FIG. 10B, as the light source and the light guide plate are more correctly aligned, the light incidence efficiency is enhanced. However, in practice, the light source and the light guide plate are limited to be perfectly aligned with each other. Therefore, even though the light source and the light guide plate are not properly aligned, when the light entrance portion of the light guide plate is formed to be larger than the other portion thereof as described in embodiments, the light exiting surface of the light source may be allowed to enter the light entering portion of the light guide plate, thereby preventing loss of light.

From the foregoing, it will be appreciated that various embodiments have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:

1. A backlight assembly comprising:
   a light guide plate having a light entrance portion; and
   a light source disposed to face the light entrance portion of the light guide plate and configured to irradiate light to the light entrance portion, wherein the light source comprises:
   a printed circuit board; and
   a plurality of light emitting diodes electrically connected to the printed circuit board and spaced apart from each other,
   wherein the light guide plate comprises:
   a base sheet;
   a first light transmissive adhesive layer disposed on one surface of the base sheet, the first light transmissive adhesive layer together with the base sheet defining the light entrance portion, wherein the first light transmissive adhesive layer comprises silicone-based adhesive, and the thickness of the first light transmissive adhesive layer becomes gradually smaller from the light entrance portion toward a center portion of the base sheet, wherein the light source includes a light exit surface facing the light entrance portion of the light guide plate, a thickness of the light entrance portion is greater than a height of the light exit surface, and a thickness of the base sheet is smaller than the height of the light exit surface;
   a reflective sheet on the first light transmissive adhesive layer; and
   a second adhesive layer on the reflective sheet, the second adhesive layer being bonded to the printed circuit board.

2. The backlight assembly of claim 1, wherein a difference in refractive index between the base sheet and the first light transmissive adhesive layer is less than about 0.05.

3. The backlight assembly of claim 1, wherein the base sheet has a refractive index in a range of about 1.45 to about 1.65, and the first light transmissive adhesive layer has a refractive index in a range of about 1.4 to about 1.65.

4. The backlight assembly of claim 1, wherein the base sheet has a thickness of about 0.2 mm to about 0.5 mm.

5. The backlight assembly of claim 1, wherein the light entrance portion has a thickness of about 0.3 mm to about 0.8 mm.

6. The backlight assembly of claim 1, wherein the base sheet comprises at least one of polymethyl methacrylate (PMMA), polycarbonate (PC), polystyrene (PS), and polyethylene terephthalate (PET).

* * * * *